United States Patent
Kulkarni et al.

[11] Patent Number: 5,915,077
[45] Date of Patent: Jun. 22, 1999

[54] IMAGE COMPRESSION USING ADJACENT PIXELS AND PREDETERMINED COLORS

[75] Inventors: Manish Kulkarni, Sunnyvale; Jonathan Hui, Fremont; Ron Barzel, Truckee, all of Calif.

[73] Assignee: Canon Kabushiki Kaisha, Tokyo, Japan

[21] Appl. No.: 08/901,664

[22] Filed: Jul. 28, 1997

[51] Int. Cl.[6] .............................. G06K 15/02; G06T 9/00; H04N 1/64

[52] U.S. Cl. ......................... 395/109; 395/114; 358/359; 382/232; 382/166

[58] Field of Search ...................................... 395/114, 109; 358/539, 502; 382/232, 239, 240, 242, 244, 166

[56] References Cited

U.S. PATENT DOCUMENTS

| | | | |
|---|---|---|---|
| 5,450,130 | 9/1995 | Foley | 348/391 |
| 5,553,200 | 9/1996 | Accad | 395/109 |

*Primary Examiner*—Scott Rogers
*Attorney, Agent, or Firm*—Fitzpatrick, Cella, Harper & Scinto

[57] ABSTRACT

Compression for color values of pixels in a raster image of pixels, in which pixels are selected in a checkerboard-like pattern. Pixels selected by the checkerboard are not compressed at all, whereas pixels not selected by the checkerboard are compressed by using the color of the closest one of adjacent selected pixels and of a few predetermined colors.

119 Claims, 12 Drawing Sheets

O = Selected-not compressed
X = Non-selected-compressed

O = Selected-not compressed
X = Non-selected-compressed

O = Selected-not compressed
X = Non-selected-compressed

IMAGE COMPRESSION USING ADJACENT PIXELS AND PREDETERMINED COLORS

BACKGROUND OF THE INVENTION

1. Field of the Invention

The present invention relates to compression of color codes for pixels in raster images, and involves compression of selected ones of the pixels by using adjacent pixels and predetermined colors.

2. Description of the Related Art

As resolution of computerized color images increases, the amount of storage needed to store such images has increased dramatically. For example, for computerized images at 400 dots per inch (dpi) resolution, each square inch of image area is formed by a 400×400 pixel matrix. Consequently, for a standard 8½×11 inch page, information for 14,960,000 pixels needs to be stored. For a four color image (such as cyan, magenta, yellow and black colors), at eight bits per color, 57 megabytes of memory are needed.

Such memory requirements strain even the most advanced personal computing equipment available today. Typically, for example, it will be expected that a user will view, manipulate, change and otherwise process the image prior to storage or viewing or printing. To do so, the image must be stored in active memory which, for the above-mentioned 8½×11 inch image, would need to be at least 57 megabytes. In addition, the time required simply to transfer an image of this size, i.e., from disk memory across a computer bus to active memory or to a printer, is enormous.

In view of the storage requirements for modern, high resolution pixel images, various compression techniques have been proposed so as to compress the image to a size that is more manageable. These compression techniques include lossy compression techniques, such as JPEG compression, sub-sampling, pixel quantization and the like, and also include non-lossy techniques such as run length encoding. These known compression techniques all have drawbacks, such as uncertain compression ratios and a slow speed for implementation, which render them useless for on-the-fly real-time usage by a computer user during image processing. Accordingly, while these known compression techniques are similar to the present invention in that their object is to compress images, they are quite different in structure and operation from the present invention.

SUMMARY OF THE INVENTION

The present invention addresses the foregoing deficiencies of known compression techniques by providing compression in which only some of the pixels in an image are compressed, and those pixels are compressed by using a code to indicate the color of the closest one of either an adjacent uncompressed pixel or a few predetermined colors. Preferably, a checkerboard-like pattern is superimposed over the raster image, and pixels selected by the checkerboard are not compressed at all. Pixels not selected by the checkerboard are compressed by using a code to indicate the color of the closest one of either adjacent non-compressed pixels and a few predetermined colors.

Thus, to compress color values for pixels that form an image, pixels are first selected from the image in a checkerboard-like pattern. Color values for the selected pixels are not compressed at all. For each non-selected pixel, its color value is compared with color values of adjacent non-compressed pixels and a few predetermined colors, to find the color value that is closest. The non-selected pixel is then compressed by replacing its color value with a short binary code that indicates which one of the adjacent selected pixels and the few predetermined colors is closest.

Advantages of the invention include a guaranteed compression ratio, since compression according to the invention does not depend on data content. For example, in a situation in which the checkerboard-like pattern results in selection of every other pixel, and where each pixel is encoded with a 32-bit color value that is replaced by a three-bit binary code indicating the closest color, then the compression ratio achieved is $$(32+32)/(32+3)=1.82.$$

This compression ratio does not change depending on data content, and can be relied on by image processing software when allocating the size of page buffers for storage of the image.

Further advantages include very fast compression since the technique is easy to apply, as well as a known and pre-defined loss in image quality.

Preferred forms of the invention will involve selection of different checkerboard-like patterns for use in specific image situations. For example, higher compression ratios can be achieved by a checkerboard-like pattern that results in selection of two out of every three pixels for encoding, whereas lower compression ratios can be achieved with a checkerboard-like pattern that results in only one out of every three pixels being encoded.

In addition, the few predefined colors that are used in connection with encoding need not be fixed colors, but also can be combinations of existing colors in the image. For example, in one form of the invention, the few predefined colors consist of the four pure colors black, red, green and blue. However, other forms of the invention can also use as the predefined colors weighted averages of pure colors and existing colors in the image. Generally speaking, the pre-defined colors can be fixed pure colors, weighted averages between fixed colors and colors in the image, linear interpolation between colors of adjacent pixels, and non-linear interpolation.

If desired, compression according to the invention can also be combined with other compression techniques, or with other techniques designed to reduce the number of bits required for accurate reproduction of the color in each pixel.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENT

Figure 1A:
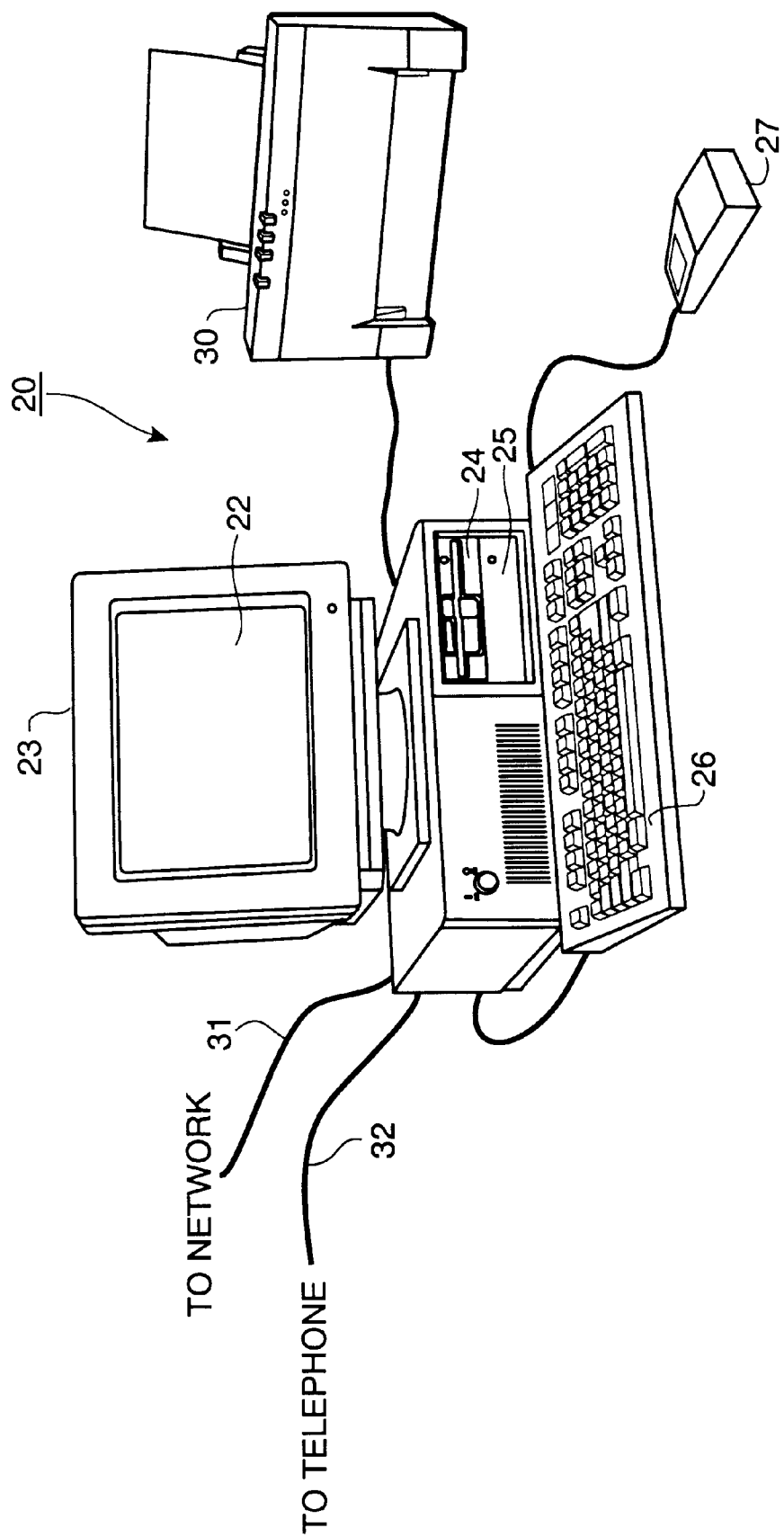
FIG. 1A is a view showing the outward appearance of representative computing equipment which incorporates compression according to the invention.

FIG. 1A is a view showing the outward appearance of representative computing equipment which can incorporate compression according to the invention. Shown in FIG. 1A is computer workstation 20 such as an IBM PC or PC-compatible computer having a windowing operating system such as a Microsoft Windows operating system. Workstation 20 is provided with a display monitor 23 having a display screen 22 on which workstation 20 displays images to the user. Workstation 20 is further provided with a floppy disk drive 24 with which removable floppy disk media may be read or written, fixed disk drive 25 for storing data files and application program files, a keyboard 26 for permitting input of text data and manipulation of objects and images displayed on display screen 22, and a pointing device 27 such as a mouse or the like which is also provided to permit manipulation of objects and images on display screen 22. A conventional color printer 30, such as a color bubble jet printer, is also provided. Also provided are connections to a network 31 and to an ordinary voice telephone line 32, both for sending and receiving color image data as well as other files such as files which include program instruction sequences by which workstation 20 is operated.

In accordance with operator instructions, and under control of the windowing operating system, stored application programs such as graphics application programs, drawing application programs, desktop publishing application programs and the like, are selectively activated to process and to manipulate data, such as and image data. Also in accordance with operator instructions, and based on those stored application programs, commands are issued to display images on monitor 23 and to print images appearing on monitor 23, and those images are then printed either on printer 30 or on a network printer, as described more fully hereinbelow.

Figure 1B:
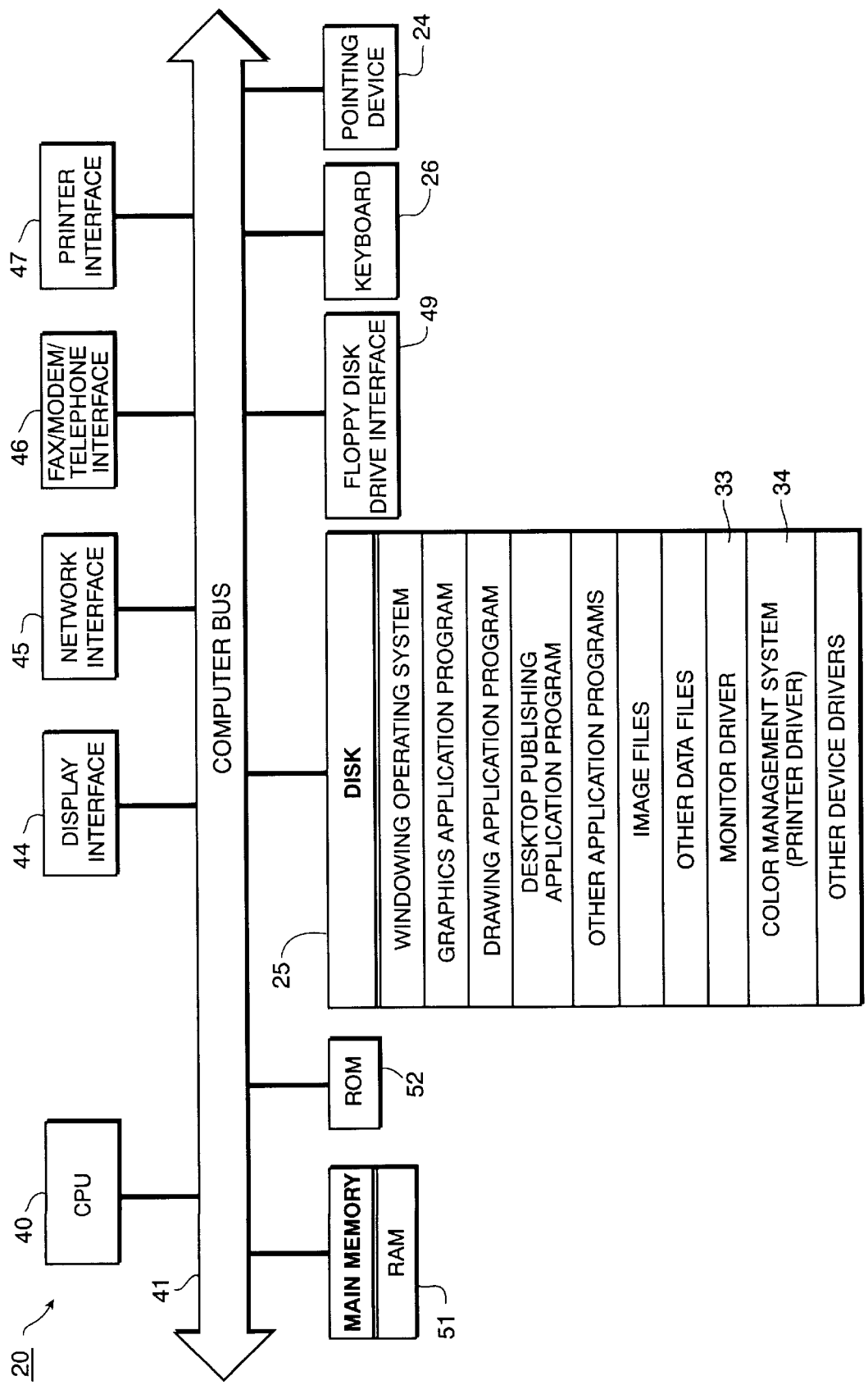
FIG. 1B is a detailed block diagram showing the internal construction of FIG. 1A.

FIG. 1B is a detailed block diagram showing the internal construction of workstation 20. As shown in FIG. 1B, workstation 20 includes a central processing unit (CPU) 40 such as a programmable microprocessor interfaced to a computer bus 41. Also interfaced to computer bus 41 is display interface 44, network interface 45 for interfacing to network 31, fax/modem/telephone interface 46 for interfacing to telephone 32, printer interface 47, and floppy disk drive interface 49.

Main memory 51 such as random access memory (RAM) interfaces to computer bus 41 so as to provide CPU 40 with access to memory storage. In particular, when executing stored application program instruction sequences such as those associated with application programs stored on disk 25, CPU 40 loads those instruction sequences from disk 25 (or other storage media such as media accessed via network 31 or floppy disk drive 24) into main memory 51 and executes those stored program instruction sequences out of main memory 51. Main memory 51 may also include a page buffer for storing image data.

ROM (read only memory) 52 is provided for storing invariant instruction sequences such as start-up instruction sequences or basic input/output operating system (BIOS) sequences for operation of keyboard 26.

As shown in FIG. 1B, and as previously mentioned, fixed disk 25 stores program instruction sequences for the windowing operating system and for various application programs such as a graphics application program, a drawing application program, a desktop publishing application program, and the like. In addition, stored on fixed disk 25 are uncompressed image files such as are displayed on monitor 23 or printed on printer 30 under control of a designated application program. Fixed disk 25 also stores files compressed in accordance with the invention as well as application programs that contain computer code (i.e., stored program instruction sequences) by which image files are compressed and by which compressed image files are de-compressed, according to the invention.

Ordinarily, application programs stored on disk 25 need first to be installed by the user onto disk 25 from other computer readable media on which those programs are initially stored. For example, it is customary for a user to purchase a floppy disk or other computer readable media on which a copy of an application program containing compression or de-compression according to the inventor is stored. The user would then install compression or de-compression onto disk 25 by inserting the purchased floppy disk into floppy disk drive 24 and by commanding CPU 40 to copy from the floppy disk onto disk 25. It is also possible for the user, via telephone 32 and modem interface 46, or via network 31 and network interface 45, to download from a computerized bulletin board to which compression or de-compression had previously been uploaded.

Figure 2A:
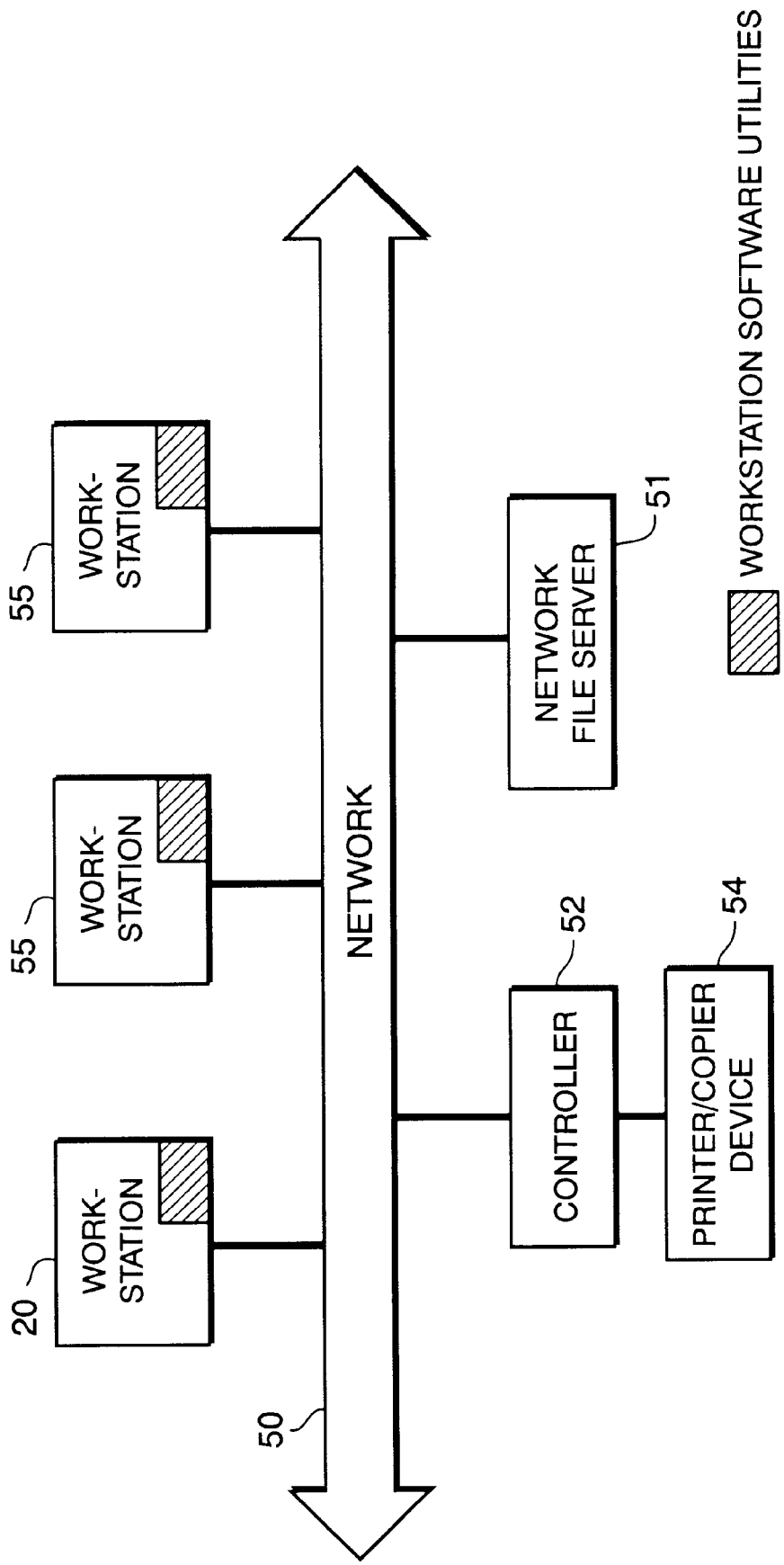
FIG. 2A is a block diagram illustrating a network in which workstation 20 is connected.

FIG. 2 is a block diagram illustrating a network in which workstation 20 is connected. Specifically, network 50 provides communications among a number of networked devices using a conventional network communications protocol, such as IPX, TCP/IP or AppleTalk. Workstation 20 and similar workstations 55 are connected to a network 50, enabling workstation 20 to communicate with each workstation 55 and with other devices connected to network 50.

One such device is network file server 51, which provides central storage of computer files. Also connected to network 50 is controller 52 which controls printer/copier device 54. Printer/copier device 54 is a device, such as a color laser printer, having color printing capabilities, and preferably is a multi-function device having both printing and copying capabilities. Utilizing the foregoing network interconnections, workstation 20 spools files to be printed to file server 51, which then sends the corresponding print data to printer/copier device 54 via network 50 and controller 52. Workstation 20 can thus print using printer/copier 54 as easily as using printer 30.

Figure 2B:
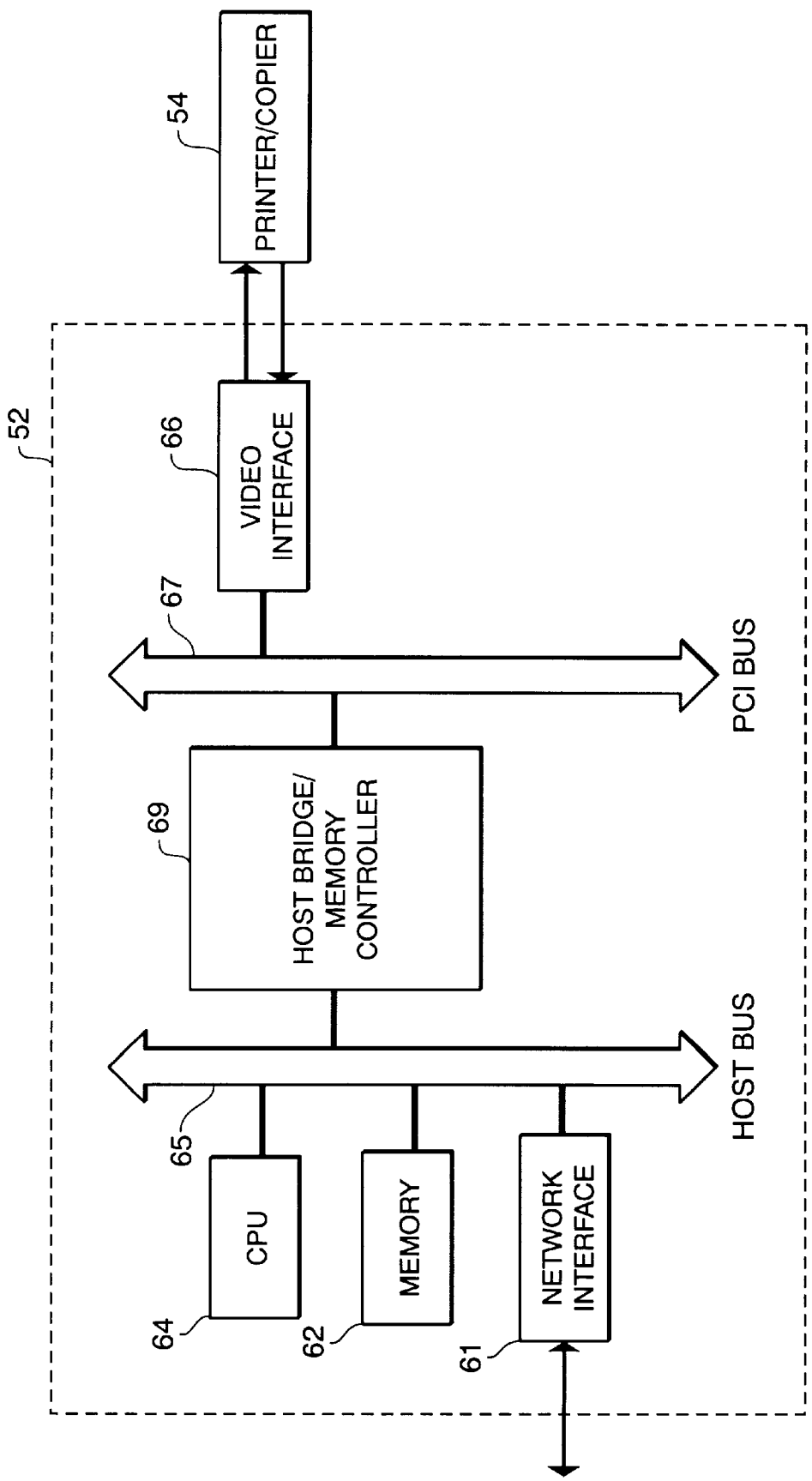
FIG. 2B is a block diagram of the internal construction of a controller which incorporates compression according to the invention.

Controller 52 is a microprocessor based controller which provides a network interface for printer/copier device 54, and also performs other pre-printing processing, such as rasterizing data which has been input from file server 51 in page description language format. FIG. 2B is a block diagram of the internal construction of controller 52. Network interface 61 interfaces with network 50. Memory 62 consists of a ROM portion and a RAM portion, the RON portion storing program instruction sequences for execution by CPU 64, and the RAM portion providing a work space memory area for use by CPU 64. More specifically, the program instruction sequences stored in the ROM portion of memory 62 include program instruction sequences for performing compression and decompression according to the invention. CPU 64 executes program instruction sequences out of the ROM portion of memory 62 in order to perform various types of image processing, such as rasterization and compression/decompression according to the invention. CPU 64, memory 62 and network interface 61 communicate with each other via host bus 65. Video interface 66 is connected to PCI bus 67 and provides an interface with printer/copier 54. Additional elements, such as a memory or an additional network interface may also be connected to PCI bus 67. Upon completion of its processing, CPU 64 outputs the processed image data to video interface 66 via host bus 65, host bridge/memory controller 69 and PCI bus 67.

In the preferred embodiment, workstation 20 prints to printer/copier 54 via network 50, and compression and decompression according to the invention is performed by controller 52. More preferably, workstation 20 outputs print jobs in page description language (PDL) to file server 51. Controller 52 then receives the PDL instructions from file server 51, generates corresponding raster images, compresses the raster images according to the invention, performs additional image processing on the compressed data, decompresses the processed data and then outputs the compressed raster image data to printer/copier 54.

However, as noted above, workstation 20 also stores program instruction sequences for performing compression and decompression according to the invention. Accordingly, when printing directly to printer 30 (i.e., non-network printing) workstation 20 can also perform compression and decompression according to the invention prior to outputting print data to printer 30.

Figure 3:
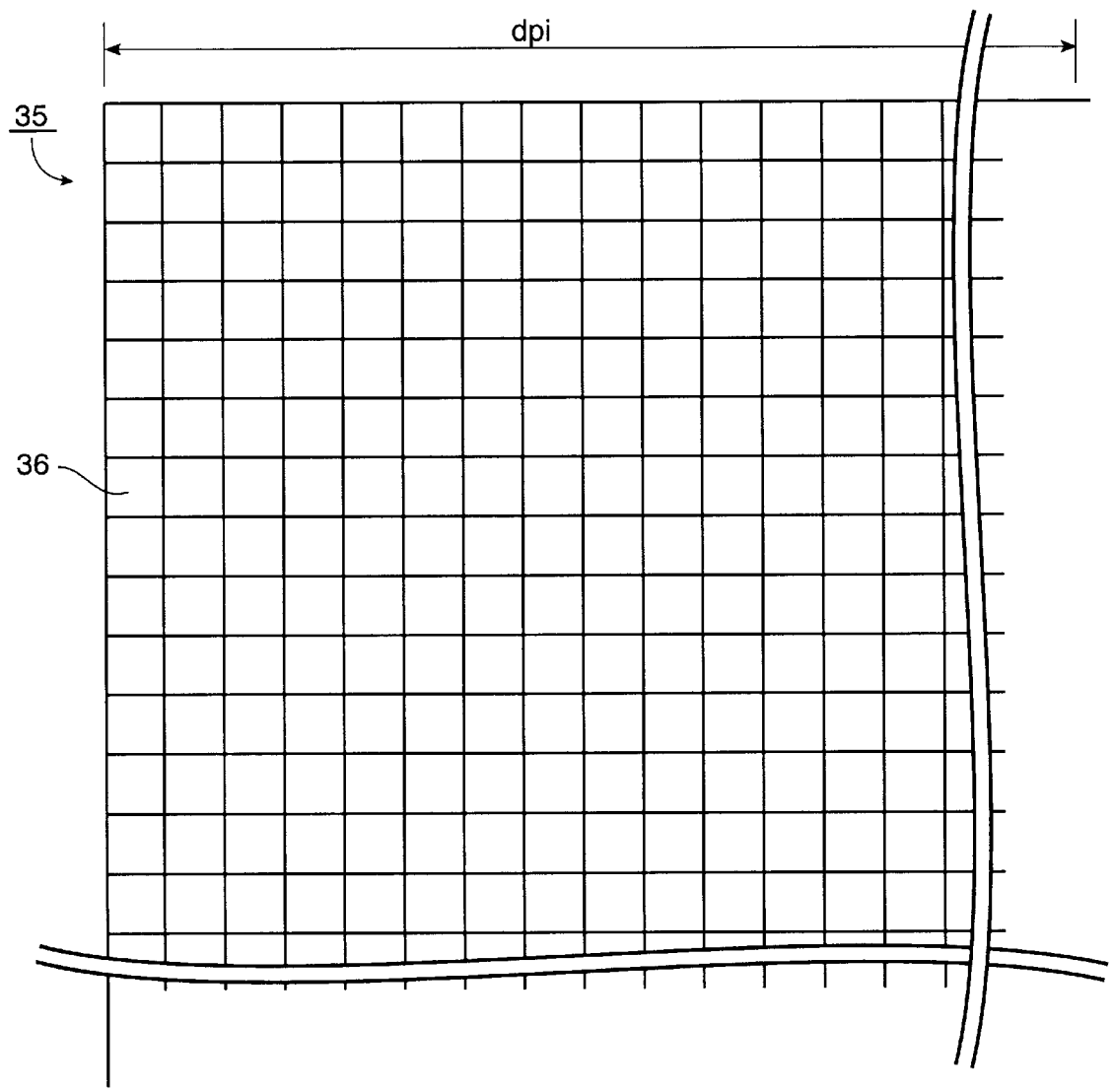
FIG. 3 is a representational view of pixels forming a raster image.

FIG. 3 is a representational view of pixels forming a raster image 35. As seen in FIG. 3, pixels 36 are arranged in a two-dimensional array of pixels so as to form the raster image, whose resolution is determined in accordance with the number of pixels per image inch. Each pixel 36 has associated with it a color value which is stored in memory such as on disk 25 or in RAM 51. The number of bits for the color value is determined by the color space which the color value represents, such as RGB, CMYK, L*a*b*, CIELAB, etc., as well as the number of bits allocated for each color component. Frequently occurring arrangements would involve eight bits for each of a red, green and blue color component, for a total of 24 bits for a color value for each pixel, and eight bits for each of a cyan, magenta, yellow and black color component, for a total of 32 bits for a color value for each pixel. Other arrangements, including black and white or gray-scale arrangements, are well known in the art.

[First Embodiment]

Figure 4:
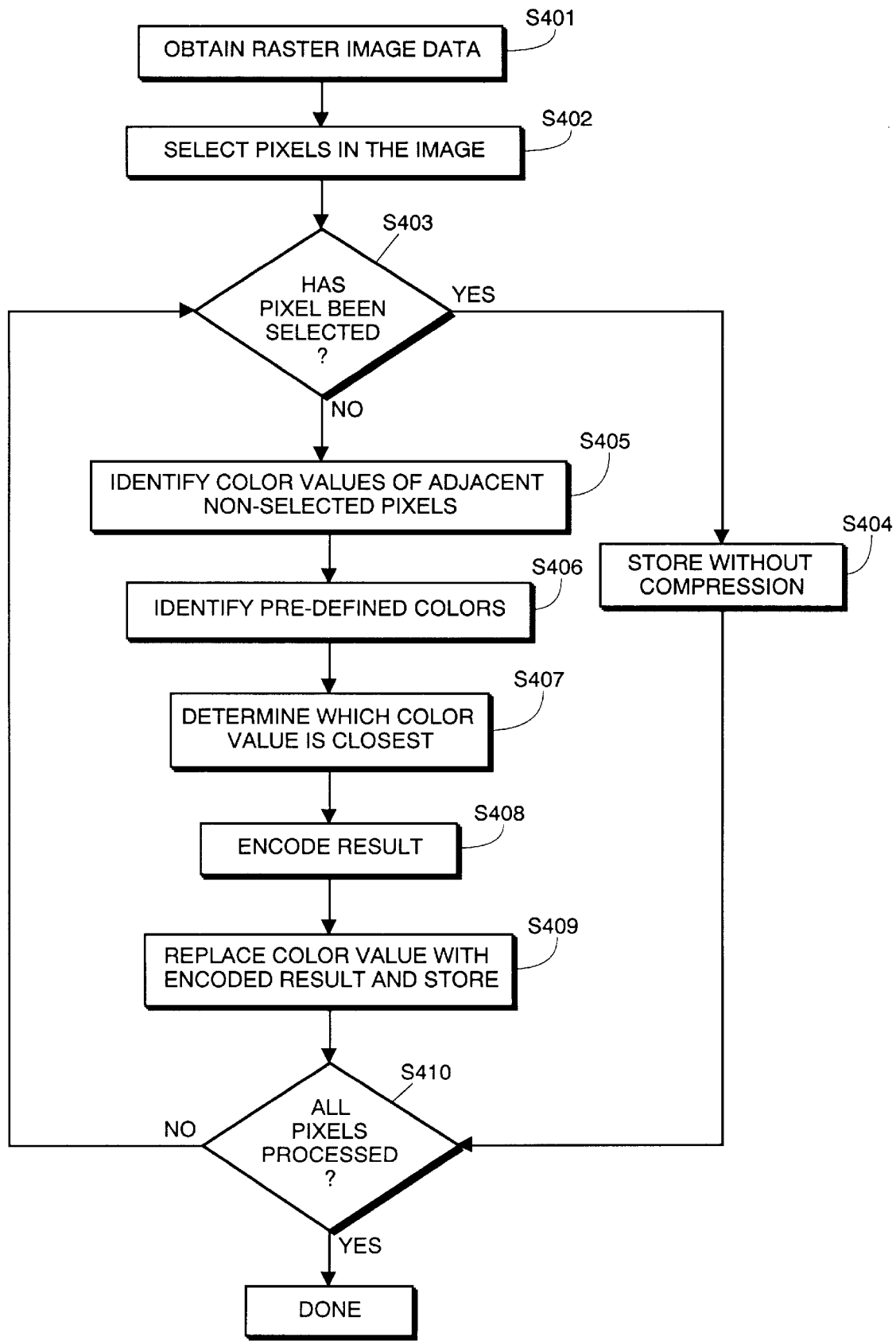
FIG. 4 is a flow diagram showing process steps for compression according to one embodiment of the invention.

FIG. 4 is a flow diagram showing process steps for compression according to one embodiment of the invention. The process steps depicted in FIG. 4 are stored as computer code in the ROM portion of memory 62 and executed by CPU 64 in controller 52, or alternatively, are stored on disk 25 or main memory 51 and executed by CPU 40 in workstation 20. Generally speaking, the process steps depicted in FIG. 4 compress color values of pixels that form a raster image by first selecting pixels from the image in a checkerboard-like pattern, and leaving uncompressed the color values of the selected pixels. For each non-selected pixel, its color value is compared with color values of adjacent selected and uncompressed pixels as well as a few predetermined colors, to find the color value that is closest. The non-selected pixel is then compressed by replacing its color value with a short binary code that indicates which one of the adjacent selected pixels and the predetermined colors is closest.

Figure 5:
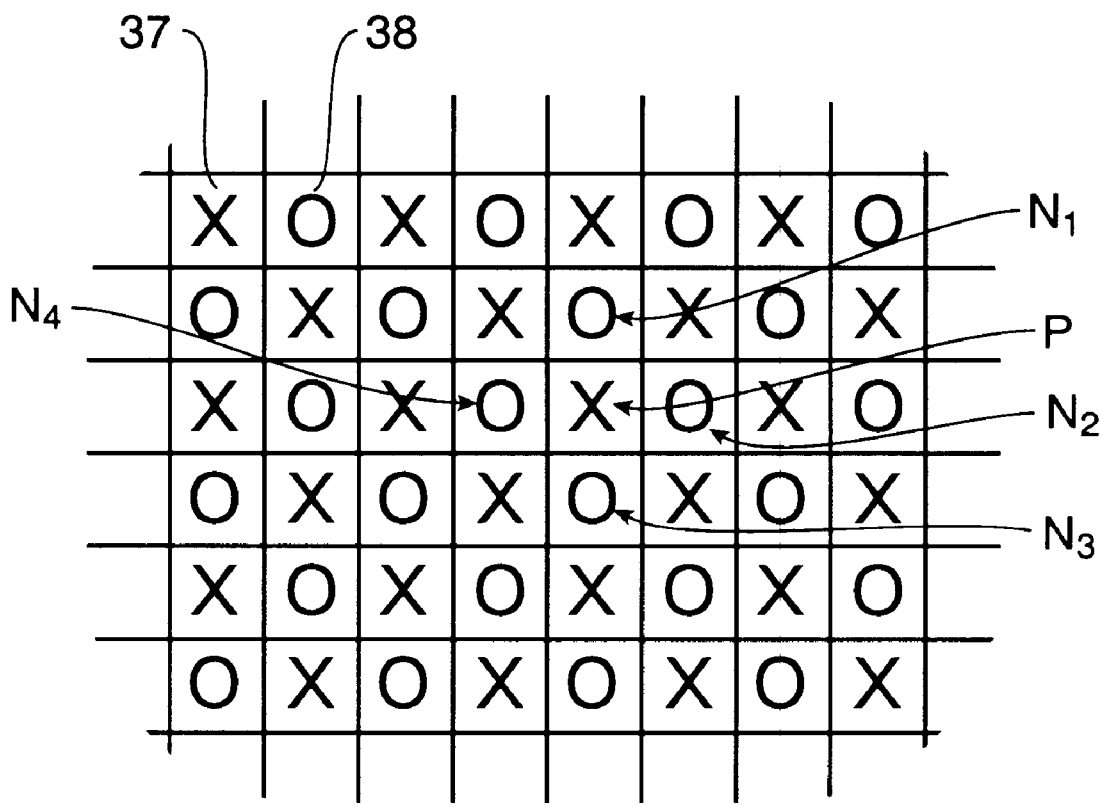
FIG. 5 is an example of pixel selection according to a checkerboard-like pattern.

In more detail, step S401 obtains raster image data for compression, and step S402 selects pixels in the image. Pixels are preferably selected in a checkerboard-like pattern, of which one example is depicted in FIG. 5. As seen in FIG. 5, which depicts a portion of pixels in a raster image, a checkerboard-like pattern is formed by selecting every other pixel in a raster row and every other pixel in a raster column. Selected pixels are indicated by an "o" and non-selected pixels are indicated by an "x". Other checkerboard-like patterns are possible, as will be described hereinbelow in connection with the fourth embodiment.

Step S403 determines whether a particular pixel has been selected, with the object of this step being that selected pixels are stored without compression, whereas non-selected pixels are compressed before storage. Thus, for pixels like pixel 38 which have been selected in step S402, step S403 determines that the pixel has been selected, and flow thereupon branches to step S404 where the color value for the pixel is stored without compression. On the other hand, for pixels like pixel 37, which have not been selected in step S402, step S403 determines that the pixel has not been selected and flow advances to steps S405 through S408 where the color value for the pixel is compressed.

To compress color values of non-selected pixels, step S405 identifies color values of adjacent, selected (and, consequently, non-compressed) pixels, step S406 identifies plural predetermined colors, step S407 determines which color value is closest to the pixel in question, and step S408 encodes the result of the determination of which color value is closest. These steps will now be explained in more detail in connection with a representative example of compression of a non-selected pixel, specifically pixel "P" of FIG. 5.

Specifically, for non-selected pixel "P", there are four adjacent pixels (pixels $N_1$, $N_2$, $N_3$ and $N_4$) which are selected and not compressed. With the checkerboard-like pattern shown in FIG. 5, these four pixels happen to be immediately adjacent, but it is to be understood that this is not necessarily the case. Each of these pixels $N_1$ through $N_4$ has a color value, and it is these color values that are identified in step S405.

Predefined color values are also identified (step S406), and in this embodiment the number of predefined color values is four. For reference purposes, the predefined color values will be referred to as $S_1$ through $S_4$, and they are defined as follows:

$S_1$=Black (CMYK=0,0,0,255)
$S_2$=Red (CMYK=0,255,255,0)
$S_3$=Green (CMYK=255,0,255,0)
$S_4$=Blue (CMYK=255,255,0,0)

Step S407 determines which color value is closest to the color value for pixel "P". Thus, whatever color value pixel "P" has, it is compared to each of the aforementioned eight color values (i.e., color values for the four adjacent pixels and color values for the predefined colors), to determine which is closest. Any suitable metric for "closeness" may be used, such as a Euclidian distance metric, a so-called "city block" distance metric (i.e., sum of absolute differences), or a Mahalanobus distance metric. Then, depending on which color value is closest to the color value of pixel "P", the result is encoded (step S408) into a three-bit binary code in accordance with the following Table 1:

TABLE 1

Compression

| Closest Pixel | Encoded Value |
|---|---|
| $N_1$ | 000 |
| $N_2$ | 001 |
| $N_3$ | 010 |
| $N_4$ | 011 |
| $S_1$ | 100 |
| $S_2$ | 101 |
| $S_3$ | 110 |
| $S_4$ | 111 |

Step S409 replaces the color value of the pixel in question with the three-bit binary encoded result, and it is this encoded result that is stored in place of the original color value for the pixel in question.

Step S410 determines whether all pixels for the raster image have been processed, and flow returns to step S403 until such time that all pixels have been processed as described above.

Figure 6:
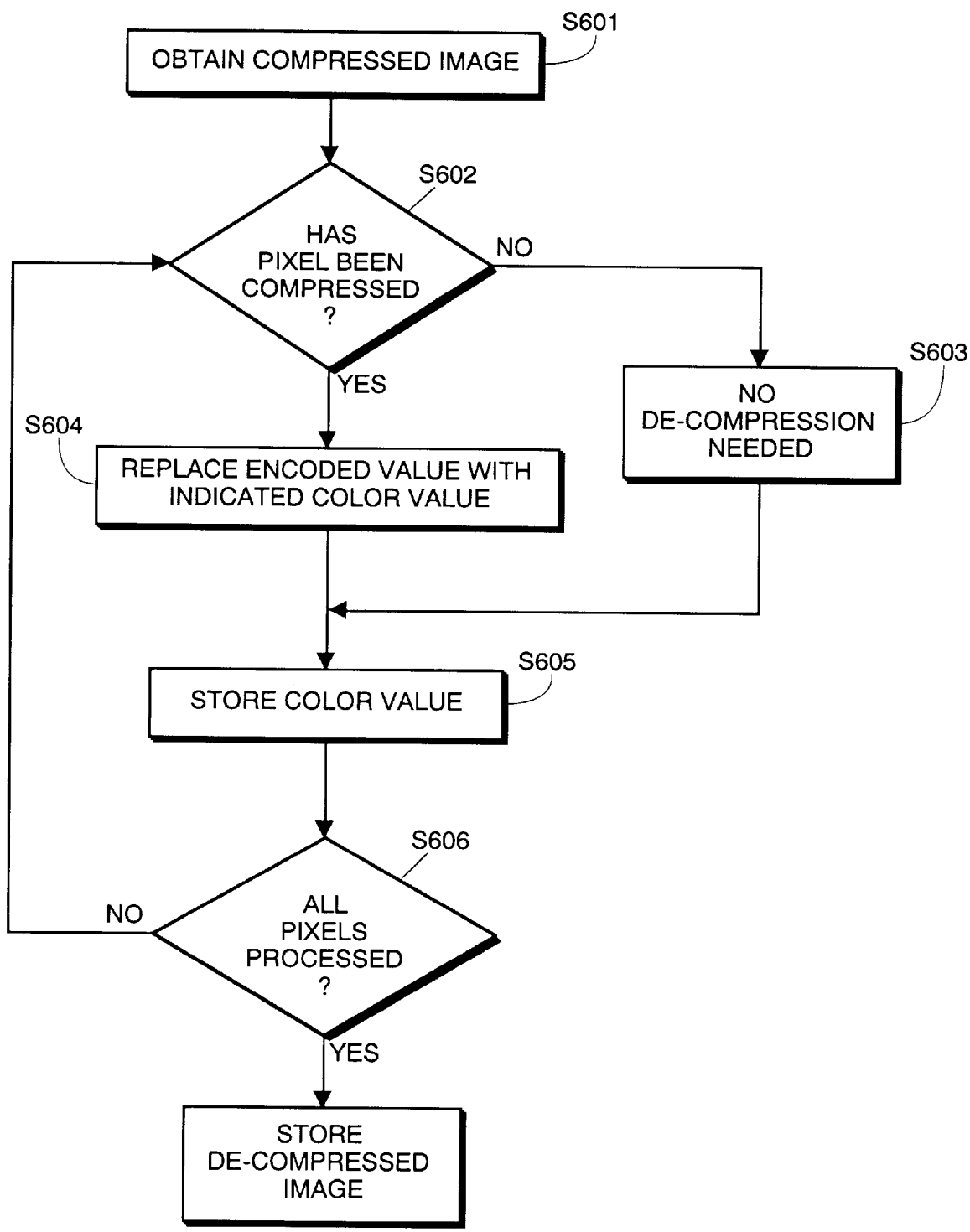
FIG. 6 is flow diagram showing process steps for decompression.

Decompression of an encoded image proceeds by a series of complementary process steps, of which an example is depicted in FIG. 6. As seen there, a compressed image is obtained in step S601, and a determination is made for each pixel as to whether or not the pixel has been compressed (step S602). If the color value for the pixel has not been compressed, then no decompression is needed and flow branches through step S603. On the other hand, if the color value for the pixel has been compressed, then flow advances to step S604 in which the encoded value for the pixel is replaced with the indicated color, as set out below in the following Table 2:

TABLE 2

De-Compression

| Encoded Pixel | Interpretation |
|---|---|
| 000 | Choose P = $N_1$ |
| 001 | Choose P = $N_2$ |
| 010 | Choose P = $N_3$ |
| 011 | Choose P = $N_4$ |
| 100 | Choose P = $S_1$ |
| 101 | Choose P = $S_2$ |
| 110 | Choose P = $S_3$ |
| 111 | Choose P = $S_4$ |

In step S605, the color value for the pixel is stored. All pixels are processed in accordance with the foregoing steps S602 through S605, as indicated in step S606, whereupon processing is completed.

It is noted that decompression in accordance with step S604 can be facilitated by storing appropriate color values in a fast look-up table stored in memory, in which case a portion of memory 62, or alternatively, a portion of RAM 51, would be allocated for Table 2, and values would be stored in memory appropriately. Specifically, the last four values in Table 2 would remain constant, inasmuch as the predefined colors are defined as constant black, red, green and blue, whereas the first four values would change depending upon the color values of adjacent pixels. Utilization of a look-up table as described above can increase processing speeds for decompression.

[Second Embodiment]

One way that the second embodiment differs from the first embodiment is in the number of bits that are used to encode non-selected pixels. Generally speaking, more or less than three bits can be used to encode a pixel, and the meaning of those bits can differ from what is described herein. For example, it is possible to encode using only two bits, in which case not all of the adjacent pixels are used for encoding, and less than four predefined colors are used.

In the second embodiment, four bits are used for encoding selected pixels. Use of four bits allows encoding of up to 16 different colors, which in this second embodiment consists of the colors of the four adjacent pixels as well as the following 12 predefined colors:

$S_1$=White (CMYK=0,0,0,0)

$S_2$=Gray (CMYK=0,0,0,128)

$S_3$=Black (CMYK=0,0,0,255)

$S_4$=Cyan (CMYK=255,0,0,0)

$S_5$=Magenta (CMYK=0,255,0,0)

$S_6$=Yellow (CMYK=0,0,255,0)

$S_7$=Red (CMYK=0,255,255,0)

$S_8$=Green (CMYK=255,0,255,0)

$S_9$=Blue (CMYK=255,255,0,0)

$S_{10}$=Light Red (0,128,128,0)

$S_{11}$=Light Green (128,0,128,0)

$S_{12}$=Light Blue (128,128,0,0)

Thus, compression according to the second embodiment proceeds generally along the lines of the process steps shown in FIG. 4, in which raster image data is obtained and pixels in the image are selected. For selected pixels, color values are stored without compression. On the other hand, for non-selected pixels, color values $N_1$ through $N_4$ of adjacent non-selected pixels are identified, and the 12 predetermined colors $S_1$ through $S_{12}$ specified above are identified. The color value of these 16 colors (i.e., $N_1$ through $N_4$ and $S_1$ through $S_{12}$) that is closest to the pixel in question is then determined, and the result is encoded in accordance with the following Table 3:

TABLE 3

| Closest Pixel | Encoded Value |
|---|---|
| $N_1$ | 0000 |
| $N_2$ | 0001 |
| $N_3$ | 0010 |
| $N_4$ | 0011 |
| $S_1$ | 0100 |
| $S_2$ | 0101 |
| $S_3$ | 0110 |
| $S_4$ | 0111 |
| $S_5$ | 1000 |
| $S_6$ | 1001 |
| $S_7$ | 1010 |
| $S_8$ | 1011 |
| $S_9$ | 1100 |
| $S_{10}$ | 1101 |
| $S_{11}$ | 1110 |
| $S_{12}$ | 1111 |

The color value of the pixel in question is then replaced with the encoded result and that result is stored.

Decompression proceeds generally along the line of the process steps shown in FIG. 6, with encoded values being replaced with color values as shown in the following table, which may be stored in memory as a look-up table.

TABLE 4

| Encoded Pixel | Interpretation |
| --- | --- |
| 0000 | Choose P = $N_1$ |
| 0001 | Choose P = $N_2$ |
| 0010 | Choose P = $N_3$ |
| 0011 | Choose P = $N_4$ |
| 0100 | Choose P = $S_1$ |
| 0101 | Choose P = $S_2$ |
| 0110 | Choose P = $S_3$ |
| 0111 | Choose P = $S_4$ |
| 1000 | Choose P = $S_5$ |
| 1001 | Choose P = $S_6$ |
| 1010 | Choose P = $S_7$ |
| 1011 | Choose P = $S_8$ |
| 1100 | Choose P = $S_9$ |
| 1101 | Choose P = $S_{10}$ |
| 1110 | Choose P = $S_{11}$ |
| 1111 | Choose P = $S_{12}$ |

[Third Embodiment]

One way that the third embodiment differs from the first two is in that the predefined colors are not fixed, but rather vary for each pixel in accordance with the color value of surrounding pixels. Generally speaking, the color values of the predetermined colors can be any combination of fixed colors and adjacent pixels, any combination of adjacent pixels alone, or any combination of fixed values alone. The combinations can be made by weighted average, linear interpolation or non-linear interpolation.

In this third embodiment, the predefined colors are defined by a weighted average of colors for the adjacent pixels alone, and do not depend on any fixed colors. Accordingly, predefined colors $S_1$ through $S_4$ are defined as follows in dependence on a weighted average of colors of adjacent pixels $N_1$ through $N_4$:

$S_1 = (2N_1 + N_3)/3$ $S_2 = (N_1 + 2N_3)/3$ $S_3 = (2N_2 + N_4)/3$ $S_4 = (N_2 + 2N_4)/3$

After determining which color value of the adjacent non-selected pixels and the predefined colors is closest to the color value of the pixel in questions, the pixel in questions is encoded in accordance with the following table:

TABLE 5

| Closest Pixel | Encoded Value |
| --- | --- |
| $N_1$ | 000 |
| $N_2$ | 001 |
| $N_3$ | 010 |
| $N_4$ | 011 |
| $S_1 = (2N_1 + N_3) / 3$ | 100 |
| $S_2 = (N_1 + 2N_3) / 3$ | 101 |
| $S_3 = (2N_2 + N_4) / 3$ | 110 |
| $S_4 = (N_2 + 2N_4) / 3$ | 111 |

Although in this third embodiment, predefined colors are identified in accordance with a linear weighted average of two adjacent colors, any linear or non-linear interpolation could be used in place of this identification. Thus, more generally speaking, encoding can be obtained as shown in the following Table 6:

TABLE 6

| Closest Pixel | Encoded Value |
| --- | --- |
| $\alpha_0 N_1 + \beta_0 N_2 + \gamma_0 N_3 + \delta_0 N_4$ | 000 |
| $\alpha_1 N_1 + \beta_1 N_2 + \gamma_1 N_3 + \delta_1 N_4$ | 001 |
| $\alpha_2 N_1 + \beta_2 N_2 + \gamma_2 N_3 + \delta_2 N_4$ | 010 |
| $\alpha_3 N_1 + \beta_3 N_2 + \gamma_3 N_3 + \delta_3 N_4$ | 011 |
| $\alpha_4 N_1 + \beta_4 N_2 + \gamma_4 N_3 + \delta_4 N_4$ | 100 |
| $\alpha_5 N_1 + \beta_5 N_2 + \gamma_5 N_3 + \delta_5 N_4$ | 101 |
| $\alpha_6 N_1 + \beta_6 N_2 + \gamma_6 N_3 + \delta_6 N_4$ | 110 |
| $\alpha_7 N_1 + \beta_7 N_2 + \gamma_7 N_3 + \delta_7 N_4$ | 111 | where $\alpha_k + \beta_k + \gamma_k + \delta_k = 1$, k=0, 1, . . . 7

Specific encoding will depend on the type of behavior that can be expected from the output device; decompression will, of course, change correspondingly to the specific encoding employed.

[Fourth Embodiment]

One way that the fourth embodiment differs from the first three is in the way that pixels are selected for encoding. Generally speaking, pixels can be selected for encoding so that more or less than every other pixel, as in the first embodiment, are selected for encoding.

Figure 7:
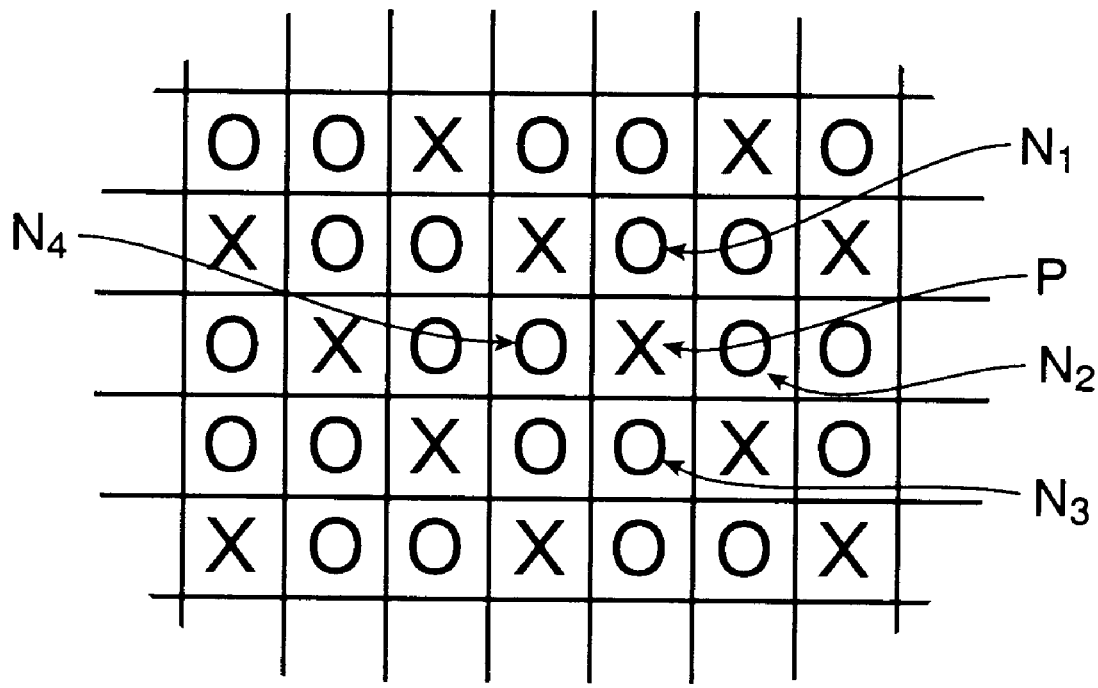
FIGS. 7 and 8 are examples of pixel selection according to other checkerboard-like patterns.

Whether more or less pixels are selected for encoding depends on the checkerboard-like pattern used to select pixels. FIG. 7, for example, depicts a checkerboard-like pattern in which more than every other pixel in a raster image row and a raster image column is selected, resulting in fewer pixels being compressed. As depicted in FIG. 7, to compress a non-selected pixel "P", adjacent pixels $N_1$ through $N_4$ (which in this case are immediately adjacent pixels) are identified and are used in conjunction with the predefined colors that have also been identified.

Figure 8:
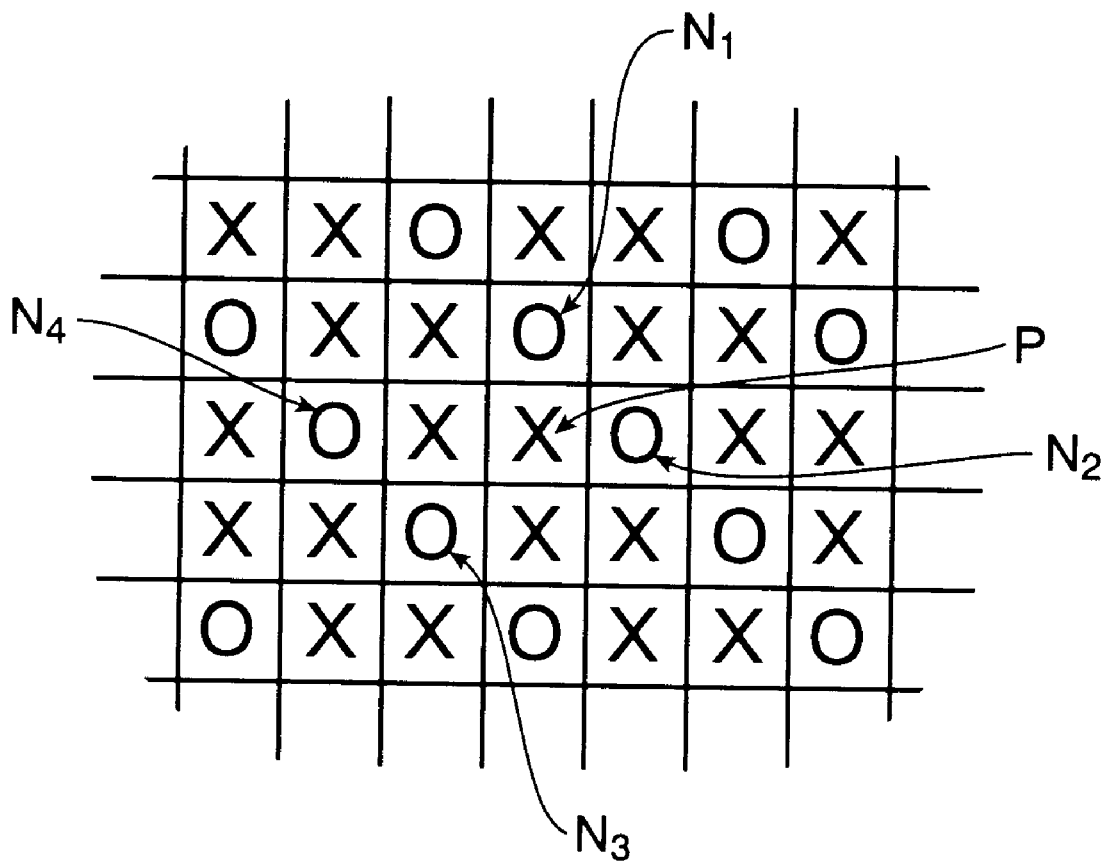

FIG. 8 depicts a checkerboard-like pattern in which fewer than every other pixel in each raster image row and raster image column is selected, resulting in more pixels being compressed. As depicted in FIG. 8, to compress a non-selected pixel such as pixel "T", adjacent pixels $N_1$ through $N_4$ (which in this case are not all immediately adjacent) are identified, and are used in connection with the predefined colors that have also been identified.

[Fifth Embodiment]

One way that the fifth embodiment differs from the first four is in that the fifth embodiment employs compression in addition to that afforded by the present invention. Generally speaking, additional compression may be employed either before or after compression according-to the invention; naturally, decompression proceeds in a complementary way.

Figure 9:
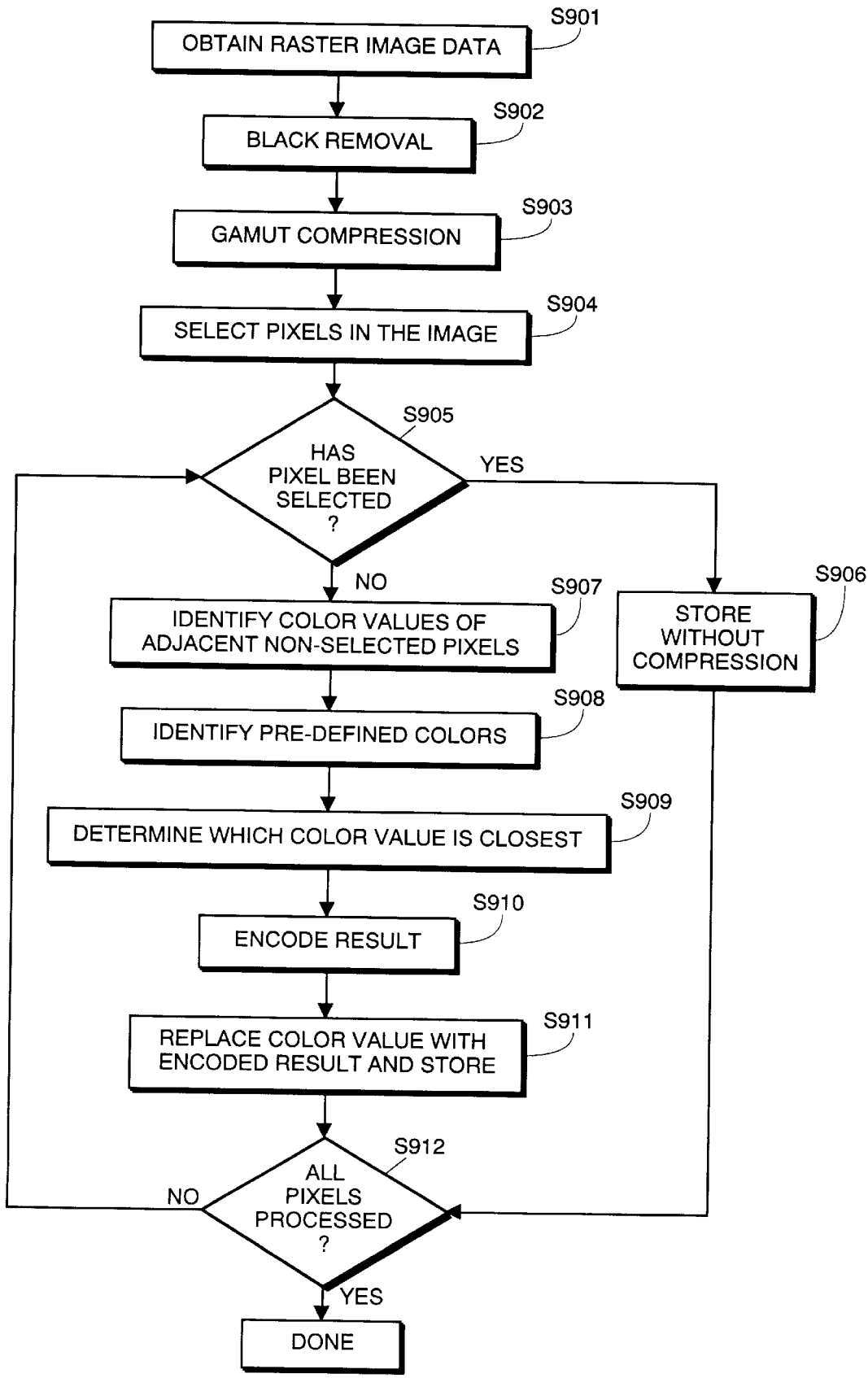
FIG. 9 is a flow diagram showing process steps for compression in accordance with another embodiment of the invention.

FIG. 9 is a flow diagram showing process steps, stored as computer code in memory 62, or alternatively on disk 25 or in memory 51, which employs compression in addition to that afforded by the present invention. In this preferred embodiment, the additional compression consists of removal of the black component from each of the CMYK color values of the image, gamut compression of the resulting CMY color value to an 18-bit CMY color value, followed by compression according to the invention. Decompression proceeds first by decompression according to the invention, followed by gamut de-compression so as to obtain a 24-bit CMY value from an 18-bit CMY value, and black generation so as to obtain an uncompressed CMYK 32-bit color value.

In more detail, in step S901, raster image data is obtained. Steps S902 and S903 apply additional compression which, in this case, is black component removal (step S902) and gamut compression (step S903), both of which techniques are well known to those skilled in the art. After additional compression in accordance with these two steps, pixels from the image are selected in step S904 according to a checkerboard-like pattern, and step S905 determines whether a particular pixel has been selected. If a particular pixel has been selected, then flow branches to step S906 in which the pixel is stored without any further compression. On the other hand, if the pixel in questions has not been selected, then flow advances to step S907 in which color values of adjacent non-selected (and non-compressed) pixels are identified (step S907), predefined color values are identified (step S908), the color value which is closest to the pixel in questions is determined (step S909), and the pixel in question is encoded in accordance with the result as to which of the adjacent selected pixels and the predetermined colors is closest (step S910). Thereafter, the color value of the pixel in questions is replaced with the encoded result and is stored (step S911) whereafter the processing of the steps S905 through S911 is repeated for all pixels in the image.

Figure 10:
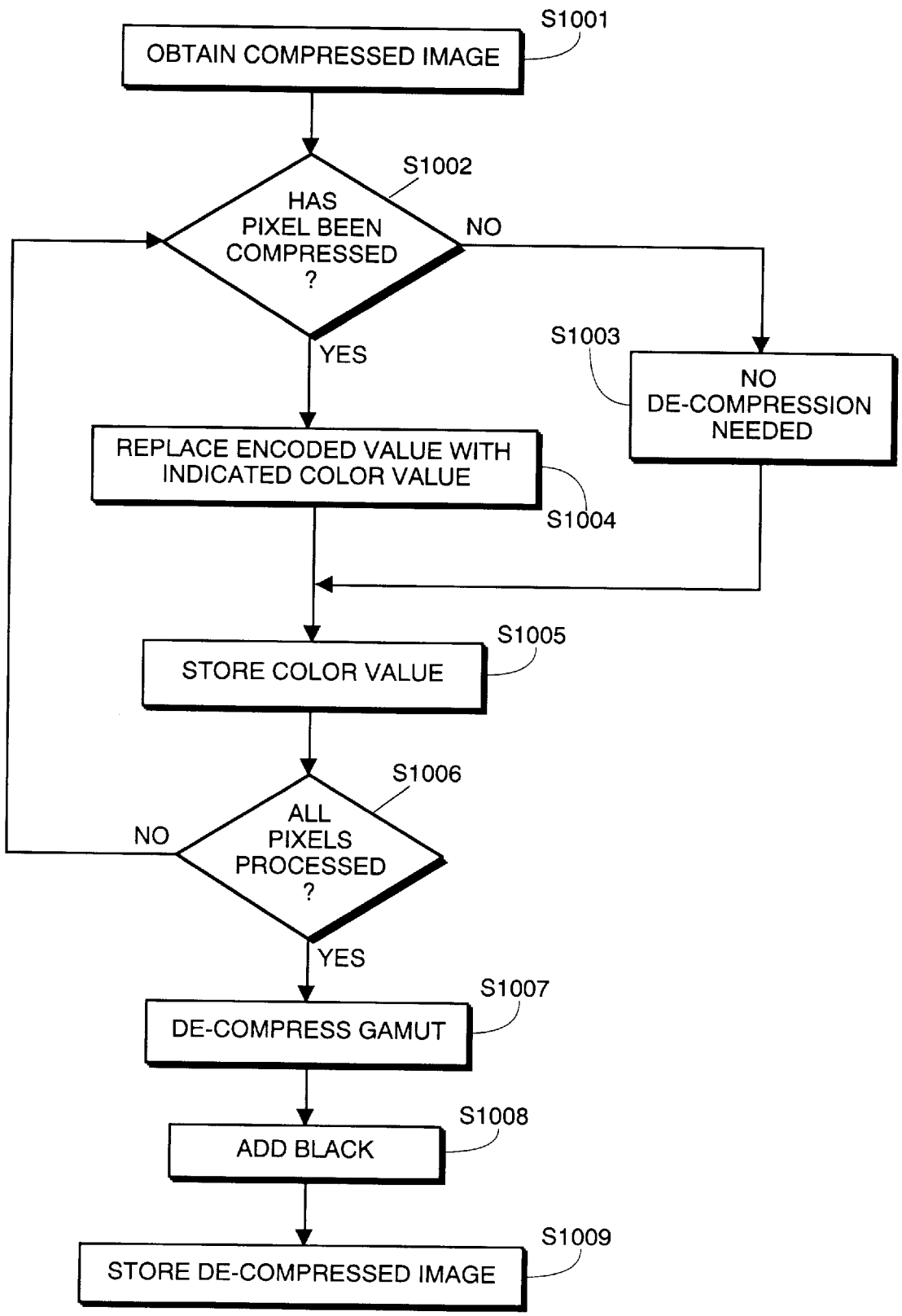
FIG. 10 is a flow diagram showing process steps for decompression.

Decompression according to this fifth embodiment proceeds in complementary fashion, as shown in FIG. 10. Thus, a compressed image is obtained in step S1001, and step S1002 determines whether a pixel has been compressed. If a pixel has not been compressed, then flow branches to step S1003 since no decompression is needed. On the other hand, if a pixel has been compressed, then flow advances to step S1004 in which the encoded value of the pixel is replaced with its indicated color value, in correspondence with the specific encoding technique. Thereafter, an 18-bit CMY color value is stored (step S1005) and such processing is repeated until all pixels have been decompressed. Thereafter, additional de-compression is afforded in steps S1007 and S1008 by de-compressing the gamut so as to obtain a 24-bit CMY color value from the 18-bit CMY color value stored in step S1005, and by adding an 8-bit black color component so as to obtain a 32-bit CMYK color value. The fully-decompressed image is thereafter stored in step S1009.

It is emphasized that several changes may be applied on the above-described system without departing from the teaching of the invention. It is intended that all the matter contained in the present disclosure, or shown in the accompanying drawings, shall be interpreted as illustrative rather than limiting. In particular, it is to be understood that any combination of the foregoing five embodiments may be utilized, so that the specifics of any one embodiment may be combined with that of any other or several other embodiments.

What is claimed is:

1. A method for compressing color values of pixels in a raster image of pixels, comprising the steps of:
    selecting pixels in a checkerboard-like pattern of the raster image;
    storing pixels selected in said selecting step without additional encoding; and
    encoding non-selected pixels based at least in part on the color value of an adjacent one of the selected pixels and a color value of a predetermined color which is not an adjacent pixel, based on which is closest in color value to color value of the non-selected pixel.

2. A method according to claim 1, wherein, in said encoding step, the adjacent pixel is immediately adjacent.

3. A method according to claim 2, wherein encoding is based at least in part on all immediately adjacent pixels.

4. A method according to claim 1, wherein the predefined color is a fixed color for all pixels in the raster image.

5. A method according to claim 1, wherein, for each pixel in the raster image, the predefined color is calculated based on a combination of color values of adjacent pixels.

6. A method according to claim 1, wherein, for each pixel in the raster image, the predefined color is calculated based on a combination of adjacent pixels and a color that is fixed for all pixels of the raster image.

7. A method according to claim 1, wherein, for each pixel in the raster image, the predefined color is calculated based on a combination of colors that are fixed for all pixels in the raster image.

8. A method according to claim 1, wherein said selecting step results in selection of approximately every other pixel in the raster image.

9. A method according to claim 1, further comprising the step of applying additional compression to the color valves in the raster image prior to said selecting step.

10. A method according to claim 9, wherein said additional compression comprises gamut compression.

11. A method according to claim 9, wherein said additional compression comprises black component removal.

12. A method for compressing color values of pixels in a raster image of pixels, comprising the steps of:
    selecting pixels from the raster image in a checkerboard-like pattern;
    storing color values of the selected pixels;
    comparing color values of each non-selected pixel with color values of adjacent selected pixels and plural predetermined colors to determine which color value is closest; and
    replacing the color value of the non-selected pixel with a binary code that indicates which of the adjacent selected pixels and the plural predetermined colors is closest.

13. A method according to claim 12, wherein, in said encoding step, the adjacent pixels are immediately adjacent.

14. A method according to claim 13, wherein encoding is based on all immediately adjacent pixels.

15. A method according to claim 12, wherein the predefined colors are fixed colors for all pixels in the raster image.

16. A method according to claim 12, wherein, for each pixel in the raster image, the predefined colors are calculated based on a combination of color values of adjacent pixels.

17. A method according to claim 12, wherein, for each pixel in the raster image, the predefined colors are calculated based on a combination of adjacent pixels and colors that are fixed for all pixels of the raster image.

18. A method according to claim 12, wherein, for each pixel in the raster image, the predefined colors are calculated based on a combination of colors that are fixed for all pixels in the raster image.

19. A method according to claim 12, wherein said selecting step results in selection of approximately every other pixel in the raster image.

20. A method according to claim 12, further comprising the step of applying additional compression to the color values in the raster image prior to said selecting step.

21. A method according to claim 20, wherein said additional compression comprises gamut compression.

22. A method according to claim 20, wherein said additional compression comprises black component removal.

23. A method for decompressing compressed color values for pixels in a raster image of pixels, the compressed color values having been obtained by compression through which non-selected pixels are compressed by using a color of-a closest one of adjacent selected pixels and plural predetermined colors, said method for decompressing comprising the steps of:
    determining whether a pixel has been compressed; and for each compressed pixel, replacing an encoded value of the compressed pixel with the color value of the closest one of the adjacent pixels and the plural predetermined colors.

24. A method according to claim 23, further comprising the step of storing a look-up table which includes, for each possible encoded value, a corresponding color value, and wherein said replacing step comprises the step of replacing the encoded value of non-selected pixels with a corresponding color value obtained from said look-up table.

25. A method according to claim 23, further comprising the step of applying additional decompression to the color values of the raster image.

26. A method according to claim 25, wherein said additional decompression comprises gamut decompression.

27. A method according to claim 25, wherein said additional decompression comprises black component removal.

28. An apparatus for compressing color values of pixels in a raster image of pixels comprising:

a memory for storing computer executable process steps; and a processor for executing the process steps stored in said memory;

wherein said process steps include steps to select pixels in a checkerboard-like pattern of the raster image, store pixels selected in said selecting step without additional encoding, and encode non-selected pixels based at least in part on the color value of an adjacent one of the selected pixels and a color value of a predetermined color which is not an adjacent pixel, based on which is closest in color value to color value of the non-selected pixel.

29. An apparatus according to claim 28, wherein, in said encoding step, the adjacent pixel is immediately adjacent.

30. An apparatus according to claim 29, wherein encoding is based at least in part on all immediately adjacent pixels.

31. An apparatus according to claim 28, wherein the predefined color is a fixed color for all pixels in the raster image.

32. An apparatus according to claim 28, wherein, for each pixel in the raster image, the predefined color is calculated based on a combination of color values of adjacent pixels.

33. An apparatus according to claim 28, wherein, for each pixel in the raster image, the predefined color is calculated based on a combination of adjacent pixels and a color that is fixed for all pixels of the raster image.

34. An apparatus according to claim 28, wherein, for each pixel in the raster image, the predefined color is calculated based on a combination of colors that are fixed for all pixels in the raster image.

35. An apparatus according to claim 28, wherein said selecting step results in selection of approximately every other pixel in the raster image.

36. An apparatus according to claim 28, wherein said process steps further include a step to apply additional compression to the color values in the raster image prior to said selecting step.

37. An apparatus according to claim 36, wherein said additional compression comprises gamut compression.

38. An apparatus according to claim 36, wherein said additional compression comprises black component removal.

39. An apparatus according to claim 28, wherein said apparatus is a printer controller, and wherein said process steps further include steps to generate the raster image based on print data which is in a page description language.

40. An apparatus for compressing color values of pixels in a raster image of pixels comprising:

a memory for storing computer executable process steps; and a processor for executing the process steps stored in said memory;

wherein said process steps include steps to select pixels from the raster image in a checkerboard-like pattern, store color values of the selected pixels, compare color values of each non-selected pixel with color values of adjacent selected pixels and plural predetermined colors to determine which color value is closest, and replace the color value of the non-selected pixel with a binary code that indicates which of the adjacent selected pixels and the plural predetermined colors is closest.

41. An apparatus according to claim 40, wherein, in said encoding step, the adjacent pixels are immediately adjacent.

42. An apparatus according to claim 41, wherein encoding is based on all immediately adjacent pixels.

43. An apparatus according to claim 40, wherein the predefined colors are fixed colors for all pixels in the raster image.

44. An apparatus according to claim 40, wherein, for each pixel in the raster image, the predefined colors are calculated based on a combination of color values of adjacent pixels.

45. An apparatus according to claim 40, wherein, for each pixel in the raster image, the predefined colors are calculated based on a combination of adjacent pixels and colors that are fixed for all pixels of the raster image.

46. An apparatus according to claim 40, wherein, for each pixel in the raster image, the predefined colors are calculated based on a combination of colors that are fixed for all pixels in the raster image.

47. An apparatus according to claim 40, wherein said selecting step results in selection of approximately every other pixel in the raster image.

48. An apparatus according to claim 40, wherein said apparatus is a printer controller, and wherein said process steps further include a step to generate the raster image based on print data which is in a page description language.

49. An apparatus according to claim 40, wherein said process steps further include a step to apply additional compression to the color values in the raster image prior to said selecting step.

50. An apparatus according to claim 49, wherein said additional compression comprises gamut compression.

51. An apparatus according to claim 49, wherein said additional compression comprises black component removal.

52. An apparatus for decompressing compressed color values for pixels in a raster image of pixels, the compressed color values having been obtained by compression through which non-selected pixels are compressed by using a color of a closest one of adjacent selected pixels and plural predetermined colors, said apparatus comprising:

a memory for storing computer executable process steps; and a processor for executing the process steps stored in said memory;

wherein said process steps include steps to determine whether a pixel has been compressed, and replace an encoded value of the compressed pixel, for each pixel compressed, with the color value of the closest one of the adjacent pixels and the plural predetermined colors.

53. An apparatus according to claim 52, wherein said process steps further comprise a step to store a look-up table which includes, for each possible encoded value, a corresponding color value, and wherein said replacing step comprises the step of replacing the encoded value of non-selected pixels with a corresponding color value obtained from said look-up table.

54. An apparatus according to claim 52, wherein said apparatus is a printer controller, and wherein said process steps further include steps to generate and compress the raster image based on print data which is in a page description language.

55. An apparatus according to claim 52, wherein said process steps further include a step to apply additional compression to the color values in the raster image.

56. An apparatus according to claim 55, wherein said additional compression comprises gamut compression.

57. An apparatus according to claim 55, wherein said additional compression comprises black component removal.

58. Computer-executable process steps stored on a computer readable medium, said process steps for compressing color values of pixels in a raster image of pixels, said process steps comprising:
   code to select pixels in a checkerboard-like pattern of the raster image;
   code to store pixels selected in said selecting step without additional encoding; and
   code to encode non-selected pixels based at least in part on the color value of an adjacent one of the selected pixels and a color value of a predetermined color which is not an adjacent pixel, based on which is closest in color value to color value of the non-selected pixel.

59. Computer-executable process steps according to claim 58, wherein the adjacent pixel is immediately adjacent.

60. Computer-executable process steps according to claim 59, wherein encoding is based at least in part on all immediately adjacent pixels.

61. Computer-executable process steps according to claim 58, wherein the predefined color is a fixed color for all pixels in the raster image.

62. Computer-executable process steps according to claim 58, wherein, for each pixel in the raster image, the predefined color is calculated based on a combination of color values of adjacent pixels.

63. Computer-executable process steps according to claim 58, wherein, for each pixel in the raster image, the predefined color is calculated based on a combination of adjacent pixels and a color that is fixed for all pixels of the raster image.

64. Computer-executable process steps according to claim 58, wherein, for each pixel in the raster image, the predefined color is calculated based on a combination of colors that are fixed for all pixels in the raster image.

65. Computer-executable process steps according to claim 58, wherein said code to select results in selection of approximately every other pixel in the raster image.

66. Computer-executable process steps according to claim 58, further comprising code to apply additional compression to the color values in the raster image prior to pixel selection.

67. Computer-executable process steps according to claim 66, wherein said additional compression comprises gamut compression.

68. Computer-executable process steps according to claim 66, wherein said additional compression comprises black component removal.

69. Computer-executable process steps stored on a computer readable medium, said process steps for compressing color values of pixels in a raster image of pixels, said process steps comprising:
   code to select pixels from the raster image in a checkerboard-like pattern;
   code to store color values of the selected pixels;
   code to compare color-values of each non-selected pixel with color values of adjacent selected pixels and plural predetermined colors to determine which color value is closest; and
   code to replace the color value of the non-selected pixel with a binary code that indicates which of the adjacent selected pixels and the plural predetermined colors is closest.

70. Computer-executable process steps according to claim 69, wherein the adjacent pixels are immediately adjacent.

71. Computer-executable process steps according to claim 70, wherein encoding is based on all immediately adjacent pixels.

72. Computer-executable process steps according to claim 69, wherein the predefined colors are fixed colors for all pixels in the raster image.

73. Computer-executable process steps according to claim 69, wherein, for each pixel in the raster image, the predefined colors are calculated based on a combination of color values of adjacent pixels.

74. Computer-executable process steps according to claim 69, wherein, for each pixel in the raster image, the predefined colors are calculated based on a combination of adjacent pixels and colors that are fixed for all pixels of the raster image.

75. Computer-executable process steps according to claim 69, wherein, for each pixel in the raster image, the predefined colors are calculated based on a combination of colors that are fixed for all pixels in the raster image.

76. Computer-executable process steps according to claim 69, wherein said code to select results in selection of approximately every other pixel in the raster image.

77. Computer-executable process steps according to claim 69, further comprising code to apply additional compression to the color values in the raster image prior pixel selection.

78. Computer-executable process steps according to claim 77, wherein said additional compression comprises gamut compression.

79. Computer-executable process steps according to claim 77, wherein said additional compression comprises black component removal.

80. Computer-executable process steps stored on a computer readable medium, said process steps for decompressing compressed color values for pixels in a raster image of pixels, the compressed color values having been obtained by compression through which non-selected pixels are compressed by using a color of a closest one of adjacent selected pixels and plural predetermined colors, said process steps comprising:
   code to determine whether a pixel has been compressed; and
   for each compressed pixel, code to replace an encoded value of the compressed pixel with the color value of the closest one of the adjacent pixels and the plural predetermined colors.

81. Computer-executable process steps according to claim 80, wherein-said process steps further comprise code to store a look-up table which includes, for each possible encoded value, a corresponding color value, and wherein said code to replace replaces the encoded value of non-selected pixels with a corresponding color value obtained from said look-up table.

82. Computer-executable process steps according to claim 80, further comprising code to apply additional compression to the color values in the raster image.

83. Computer-executable process steps according to claim 82, wherein said additional compression comprises gamut compression.

84. Computer-executable process steps according to claim 82, wherein said additional compression comprises black component removal.

85. A computer-readable memory medium in which computer-executable process steps are stored, the process steps for compressing color values of pixels in a raster image of pixels, wherein the process steps comprise:

a selecting step to select pixels in a checkerboard-like pattern of the raster image;

a storing step to store pixels selected in said selecting step without additional encoding; and an encoding step to encode non-selected pixels based at least in part on the color value of an adjacent one of the selected pixels and a color value of a predetermined color which is not an adjacent pixel, based on which is closest in color value to color value of the non-selected pixel.

86. Computer-readable memory medium according to claim 85, wherein-, in said encoding step, the adjacent pixel is immediately adjacent.

87. Computer-readable memory medium according to claim 86, wherein encoding is based at least in part on all immediately adjacent pixels.

88. Computer-readable memory medium according to claim 85, wherein the predefined color is a fixed color for all pixels in the raster image.

89. Computer-readable memory medium according to claim 85, wherein, for each pixel in the raster image, the predefined color is calculated based on a combination of color values of adjacent pixels.

90. Computer-readable memory medium according to claim 85, wherein, for each pixel in the raster image, the predefined color is calculated based on a combination of adjacent pixels and a color that is fixed for all pixels of the raster image.

91. Computer-readable memory medium according to claim 85, wherein, for each pixel in the raster image, the predefined color is calculated based on a combination of colors that are fixed for all pixels in the raster image.

92. Computer-readable memory medium according to claim 85, wherein said selecting step results in selection of approximately every other pixel in the raster image.

93. Computer-readable memory medium according to claim 85, wherein said process steps further comprise the step of applying additional compression to the color values in the raster image prior to said selecting step.

94. Computer-readable memory medium according to claim 93, wherein said additional compression comprises gamut compression.

95. Computer-readable memory medium according to claim 93, wherein said additional compression comprises black component removal.

96. A computer-readable memory medium in which computer-executable process steps are stored, the process steps for compressing color values of pixel in a raster image of pixels, wherein the process steps comprise:

a selecting step to select pixels from the raster image in a checkerboard-like pattern;

a storing step to store color values of the selected pixels;

a comparing step to compare color values of each non-selected pixel with color values of adjacent selected pixels and plural predetermined colors to determine which color value is closest; and a replacing step to replace the color value of the non-selected pixel with a binary code that indicates which of the adjacent selected pixels and the plural predetermined colors is closest.

97. Computer-readable memory medium according to claim 96, wherein, in said encoding step, the adjacent pixels are immediately adjacent.

98. Computer-readable memory medium according to claim 97, wherein-encoding is based on all immediately adjacent pixels.

99. Computer-readable memory medium according to claim 96, wherein the predefined colors are fixed colors for all pixels in the raster image.

100. Computer-readable memory medium according to claim 96, wherein, for each pixel in the raster image, the predefined colors are calculated based on a combination of color values of adjacent pixels.

101. Computer-readable memory medium according to claim 96, wherein, for each pixel in the raster image, the predefined colors are calculated based on a combination of adjacent pixels and colors that are fixed for all pixels of the raster image.

102. Computer-readable memory medium according to claim 96, wherein, for each pixel in the raster image, the predefined colors are calculated based on a combination of colors that are fixed for all pixels in the raster image.

103. Computer-readable memory medium according to claim 96, wherein said selecting step results in selection of approximately every other pixel in the raster image.

104. Computer-readable memory medium according to claim 96, wherein said process steps further comprise the step of applying additional compression to the color values in the raster image prior to said selecting step.

105. Computer-readable memory medium according to claim 104, wherein said additional compression comprises gamut compression.

106. Computer-readable memory medium according to claim 104, wherein said additional compression comprises black component removal.

107. A computer-readable memory medium in which computer-executable process steps are stored, the process steps for decompressing color values for pixels in a raster image of pixels, wherein the compressed color values have been obtained by compression through which non-selected pixels are compressed by using a color of a closest one of adjacent selected pixels and plural predetermined colors, wherein the process steps comprise:

a determining step to determine whether a pixel has been compressed; and for each compressed pixel, a replacing step to replace an encoded value of the compressed pixel with the color value of the closest one of the adjacent pixels and the plural predetermined colors.

108. Computer-readable memory medium according to claim 107, wherein said process steps further comprise a storing step to store a look-up table which includes, for each possible encoded value, a corresponding color value, and wherein said replacing step replaces the encoded value of non-selected pixels with a corresponding color value obtained from said look-up table.

109. Computer-readable memory medium according to claim 107, wherein said process steps further comprise the step of applying additional decompression to the color values of the raster image.

110. Computer-readable memory medium according to claim 109, wherein said additional compression comprises gamut compression.

111. Computer-readable memory medium according to claim 109, wherein said additional compression comprises black component removal.

112. A method for printing over a network, said method comprising:

outputting print information in a page description language from a computer workstation to a network;

receiving the print information in the page description language over the network at a controller;

generating, in the controller, raster image data, corresponding to a raster image, based on the print information in the page description language;

compressing, in the controller, the raster image data generated in said generating step;

decompressing, in the controller, the processed raster image data;

outputting the decompressed raster image data from the controller to a printer; and printing images corresponding to the output decompressed raster image data using the printer, wherein the compressing step includes the steps of:

selecting pixels in a checkerboard-like pattern of the raster image;

storing pixels selected in said selecting step without additional encoding; and encoding non-selected pixels based at least in part on the color value of an adjacent one of the selected pixels and a color value of a predetermined color which is not an adjacent pixel, based on which is closest in color value to a color value of the non-selected pixel.

113. A method according to claim 112, further comprising the step of applying additional decompression to the color values of the raster image.

114. A method according to claim 113, wherein said additional compression comprises gamut compression.

115. A method according to claim 113, wherein said additional compression comprises black component removal.

116. An apparatus for obtaining printed images, said apparatus comprising:

a computer workstation for outputting print information in a page description to a network;

a controller for receiving the print information in the page description language over the network, generating raster image data, corresponding to a raster image, based on the print information in the page description language, compressing the generated raster image data, decompressing the processed raster image data, and outputting the decompressed raster image data; and a printer for receiving the decompressed raster image data from the controller and for printing images corresponding to the decompressed raster image data, wherein the controller compresses the generated raster image data by-selecting pixels in a checkerboard-like pattern of the raster image, stores the selected pixels without additional encoding, and encodes non-selected pixels based at least in part on the color value of an adjacent one of the selected pixels and a color value of a predetermined color which is not an adjacent pixel, based on which is closest in color value to a color value of the non-selected pixel.

117. An apparatus according to claim 116, wherein the controller applies additional decompression to the color values of the raster image.

118. An apparatus according to claim 117, wherein said additional compression comprises gamut compression.

119. An apparatus according to claim 117, wherein said additional compression comprises black component removal.

* * * * *

UNITED STATES PATENT AND TRADEMARK OFFICE
CERTIFICATE OF CORRECTION

PATENT NO. : 5,915,077

DATED : June 22, 1999

INVENTORS : Manish Kulkarni, Jonathan Hui and Ron Barzel

It is certified that error appears in the above-identified patent and that said Letters Patent is hereby corrected as shown below:

COLUMN 3

Line 45, after "as", delete "and".

COLUMN 4

Line 67, change "RON" to --ROM--.

COLUMN 9

Line 47, change "questions" (both occurrences) to --question--.

COLUMN 10

Line 47, change "according-to" to --according to--.

COLUMN 11

Line 5, change "questions" to --question--; and

Line 14, change questions" to --question--.

COLUMN 12

Line 62, change "of-a" to --of a--.

UNITED STATES PATENT AND TRADEMARK OFFICE
CERTIFICATE OF CORRECTION

PATENT NO. : 5,915,077

DATED : June 22, 1999

INVENTORS : Manish Kulkarni, Jonathan Hui and Ron Barzel

It is certified that error appears in the above-identified patent and that said Letters Patent is hereby corrected as shown below:

COLUMN 16

Line 36, after "prior" insert --to--; and

Line 59, change "wherein-said" to --wherein said--.

COLUMN 17

Line 22, change "wherein-," to --wherein,--.

COLUMN 18

Line 8, change "wherein-encoding--; to --wherein encoding--.

COLUMN 20

Line 20, change "by-selecting" to --by selecting--.

Signed and Sealed this

Thirtieth Day of November, 1999

Attest:

Q. TODD DICKINSON

*Attesting Officer*

*Acting Commissioner of Patents and Trademarks*